United States Patent [19]
Yakymyshyn et al.

[11] Patent Number: 5,353,262
[45] Date of Patent: Oct. 4, 1994

[54] OPTICAL TRANSDUCER AND METHOD OF USE

[75] Inventors: Christopher P. Yakymyshyn; William T. Lotshaw, both of Schenectady; Donna C. Hurley, Albany, all of N.Y.

[73] Assignee: General Electric Company, Schenectady, N.Y.

[21] Appl. No.: 31,159

[22] Filed: Mar. 12, 1993

[51] Int. Cl.$^5$ ............................................. H04R 23/00
[52] U.S. Cl. .................................. 367/149; 73/632; 73/655; 340/566; 356/256
[58] Field of Search ................. 367/149; 73/632, 655; 340/566; 356/256

[56] References Cited

U.S. PATENT DOCUMENTS

| | | | |
|---|---|---|---|
| 3,449,692 | 6/1969 | Haake | 350/266 |
| 3,808,557 | 4/1974 | Smiley | 332/7.51 |
| 3,975,628 | 8/1976 | Graves et al. | 250/199 |
| 4,546,458 | 10/1985 | Cielo et al. | 367/149 |
| 4,947,399 | 8/1990 | Sheldon et al. | 372/29 |
| 5,132,979 | 7/1992 | Erbert | 372/28 |
| 5,136,607 | 8/1992 | Morbieu | 372/92 |

OTHER PUBLICATIONS

Schulz et al., Frequency-Modulated Nd:YAG Laser, Optics Letters, vol. 16, No. 8, Apr. 15, 1991, 1991 Optical Society of America, pp. 578–580.

Owyoung et al., Stress–Induced Tuning of a Diode–Laser–Excited Monolithic Nd:YAG Laser, Optical Society of America, Dec. 1987, vol. 12, No. 12, Optics Letters, pp. 999–1001.

Zayhowski et al., Frequency Tuning of Microchip Lasers Using Pump–Power Modulation, IEEE Journal of Quantum Electronics, vol. 28, No. 4, Apr. 1992, pp. 1118–1122.

Zayhowski et al., Single–Frequency Microchip Nd Lasers, Optics Letters, vol. 14, No. 1, Jan. 1, 1989, Optical Society of America, pp. 24–26.

Hutchins et al., Pulsed Photoacoustic Materials Characterization, IEEE Transactions on Ultrasonics, Ferroelectrics, and Frequency Control, vol. UFFC-33, No. 5, Sep. 1986, pp. 429–449.

Alcoz et al., Embedded Fiber–Optic Fabry–Perot Ultrasound Sensor, IEEE Transactions on Ultrasonics, Ferroelectrics, and Frequency Control, vol. 37, No. 4, Jul. 1990, pp. 302–306.

*Primary Examiner*—J. Woodrow Eldred
*Attorney, Agent, or Firm*—Donald S. Ingraham; Marvin Snyder

[57] ABSTRACT

An optical transducer, such as used in an ultrasound system, includes a signal laser which generates an optical signal the frequency of which varies in correspondence with acoustic energy incident on the transducer. An optical cavity in the signal laser is disposed such that incident acoustic energy causes compression and rarefaction of the optical cavity, and this displacement varies optical frequency generated by the laser. A laser pump coupled to the lasing medium is adapted to apply selected levels of excitation energy appropriate to the generation and detection of acoustic pulses. The signal laser alternatively is adapted such that the refractive index of the optical cavity is varied in correspondence with the incident acoustic energy to modulate the optical frequency of the light generated by the signal laser. A piezoelectric device is disposed to receive the incident acoustic energy and generate a corresponding electrical signal that is applied to an electro-optic cell in the optical cavity, or alternatively, to conductors to generate an electric field across the lasing medium.

45 Claims, 5 Drawing Sheets

OPTICAL TRANSDUCER AND METHOD OF USE

BACKGROUND OF THE INVENTION

This invention relates generally to imaging of acoustic energy and in particular to laser-based ultrasound generation and detection equipment.

Ultrasound equipment is commonly used in medical imaging and for non-destructive evaluation of materials. Ultrasound analysis involves the propagation of energy through solids, liquids, and gases as acoustic waves; typically a pulse of acoustic energy is applied to an object to be imaged and reflected waves of the acoustic pulse are detected and processed for imaging and analysis. The spatial relationship and amplitude of the reflected waves provide information as to the location and nature of structures that reflected the acoustic energy in the object being analyzed.

Piezoelectric transducers are frequently used to generate ultrasound pulses transmitted into the object to be analyzed and to detect reflected waves received at the transducer. Piezoelectric devices require extensive electrical cabling which places practical limits on the number of pixels that can be placed in a transducer array, which in turn limits the resolution of the array.

Optical techniques have also been used for generation and detection of acoustic waves in ultrasound imaging. For example, energy from a laser beam focussed on the surface of an object to be examined can generate an acoustic pulse in the object. The return pulse of acoustic energy is typically detected optically through the use of interferometry. A review of such techniques is provided in the book *Laser Ultrasonics—Techniques and Applications* by C. B. Scruby and L. E. Drain (IOP Publishing Ltd 1990), which is incorporated herein by reference. Noninterferometric techniques of optical detection of ultrasound include the knife-edge and surface-grating techniques and techniques based on reflectivity and light filters. See "Optical Detection of Ultrasound" by J. P. Monchalin, *IEEE Transaction on Ultrasonics, Ferroelectrics, and Frequency Control*, UFFC-33, September 1986, which is incorporated herein by reference. These laser-based methods of ultrasound detection are much less sensitive, by several orders of magnitude, than conventional piezoelectric-based methods.

Another laser-based method for detecting sound waves has been suggested in the article "Laser Hydrophone" by Y. A. Bykovskii et al., in *Sov. Phys. Acoust.* 34, p 204, March 1988. In the Bykovskii et al. optical hydrophone, movement of the hydrophone membrane varies the power and/or the phase of a semiconductor laser in the hydrophone to generate changes in the amplitude of an optical signal. The Bykovskii sonar hydrophone is relatively inefficient and thus has low sensitivity.

It is accordingly an object of this invention to provide a laser transducer for detecting acoustic energy.

Another object of this invention is to provide a laser transducer for generating and detecting ultrasound pulses.

It is a further object of this invention to provide a laser ultrasound apparatus that is relatively compact and adapted to having a large number of transducer pixels in a compact transducer array.

A still further object of this invention is to provide a laser ultrasound apparatus that exhibits high sensitivity and a wide dynamic range.

SUMMARY OF THE INVENTION

In accordance with the present invention an optical transducer assembly includes a transducer housing and a signal laser mounted in the transducer housing. The optical frequency generated by the signal laser is modulable (that is, adapted to or capable of being modulated) in correspondence with acoustic energy incident on the transducer assembly. The signal laser comprises an optical cavity in which a lasing medium is disposed, and first and second reflectors that are disposed at respective opposite end surfaces of the optical cavity along an optical path axis of the cavity. The second reflector can alternatively be replaced with a compliant cavity that acts as a Gires-Tournois interferometer. The signal laser is adapted such that acoustic energy incident on the transducer assembly changes the length of a cavity along the optical path axis, or, alternatively, changes the index of refraction in the optical cavity, and such changes result in a substantially linear variation of the optical frequency of light generated by the laser.

In one embodiment, the signal laser is mounted in the transducer housing such that acoustic energy incident on the transducer assembly is transmitted along the optical path axis of the optical cavity causing alternating compression and rarefaction of the optical cavity, thereby varying the length of the optical cavity and consequently varying the frequency of light generated by the signal laser. In another embodiment, a compliant cavity that is a Gires-Tournois interferometer is coupled to the lasing medium in lieu of the second reflector such that changes in the incident acoustic energy cause variations in the length of the compliant cavity, which in turn causes a change in the effective optical cavity length of the signal laser with a resultant modulation of the optical frequency of the laser.

In a further alternative embodiment, the signal laser is adapted such that incident acoustic energy is translated into a change in the index of refraction along the optical path between the first and second reflectors such that the optical frequency generated by the signal laser varies in correspondence with the incident acoustic energy. In this embodiment, a piezoelectric device is typically disposed to receive the incident acoustic energy and generate a corresponding electrical signal. The piezoelectric device is electrically coupled to conductors to apply an electric field across the lasing medium. The lasing medium is typically adapted such that variations in the electric field generate a corresponding change in the index of refraction of the lasing medium. Alternatively, the piezoelectric device is coupled to drive an electro-optic device disposed in the optical path and the electro-optic device is adapted to cause a change in the index of refraction.

A laser pump is coupled to the signal laser and is adapted to provide a selectable level of excitation energy to the lasing medium to activate the signal laser. In one embodiment of this invention, the signal laser is mounted in the transducer housing to allow displacement along the optical path axis of a medium in a cavity in the signal laser, the amount of displacement being dependent upon the selected level of excitation energy absorbed by the medium. In a transmit mode, the laser pump is adapted to apply sufficient excitation energy to the medium to generate an ultrasound pulse in an object to which it is coupled.

In an ultrasound system, the optical signal generated by the signal laser is typically coupled to a signal processing assembly for display and analysis. The signal processing assembly advantageously comprises heterodyne detection devices, or alternatively, spectral filter detection devices adapted to generate an output signal corresponding to the amplitude of the incident acoustic energy detected by the signal laser.

A method of performing ultrasound analysis of an object comprises the steps of generating an ultrasound pulse in a transducer; communicating the ultrasound pulse into the object; modulating the optical frequency of a signal laser in correspondence with incident acoustic energy, for example, reflections of the ultrasound pulse from the object; and processing the optical signal generated by the laser to generate an output signal corresponding to the detected reflections of the ultrasound pulse.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
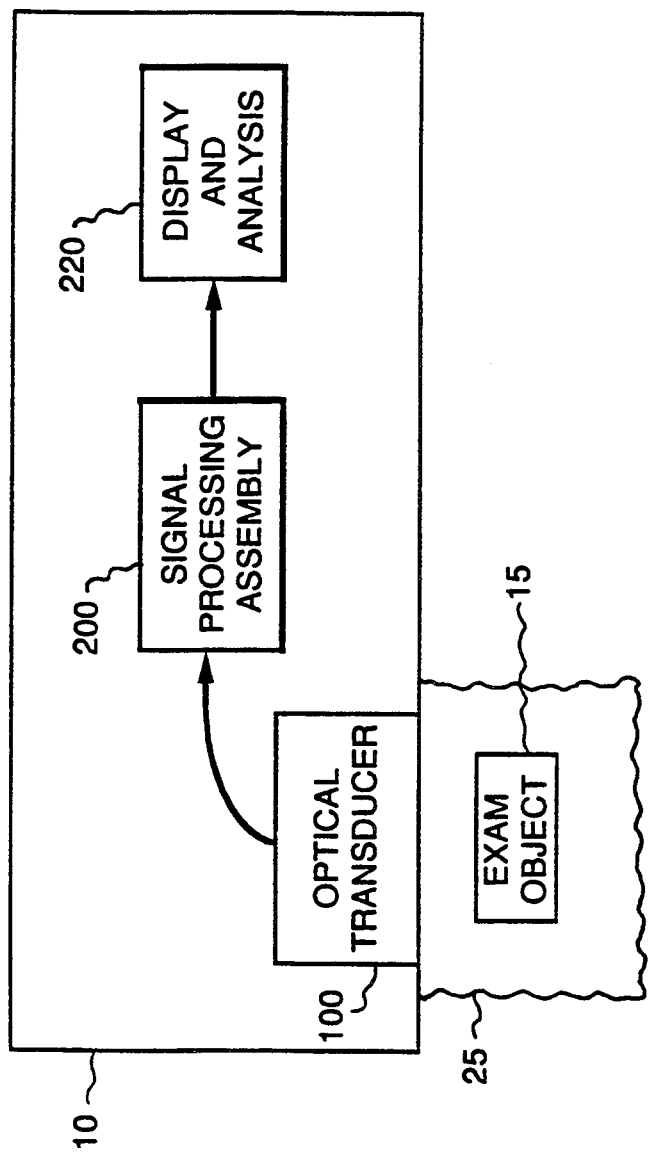
FIG. 1 is a block diagram of an ultrasound system comprising the present invention.

In FIG. 1, an ultrasound system 10 for analyzing an examination object 15 with acoustic energy is shown comprising an optical transducer 100, a signal processing assembly 200, and a display and analysis module 220. Optical transducer 100 is acoustically coupled to object 15 through an acoustic couplant 25 (e.g., water) such that acoustic energy reflected from object 15 is received by transducer 100; transducer 100 is advantageously also adapted to transmit an acoustic pulse though couplant 25 into object 15 such that some portion of the acoustic pulse is reflected back to transducer 100 by object 15. In accordance with this invention, optical transducer 100 is adapted so that acoustic energy incident on the transducer modulates the frequency of an optical signal generated by the transducer such that the optical frequency corresponds to the amplitude of the incident acoustic energy. Transducer 100 is in turn optically coupled to signal processing assembly 200 such that a processed output signal corresponding to the received acoustic energy is generated. Display and analysis module 220 is coupled to processing assembly 200 so that the processed output signal is visually presented or otherwise analyzed.

FIG. 2 illustrates in greater detail one embodiment of optical transducer 100. In accordance with this invention, transducer 100 comprises a transducer housing 110 and a signal laser 120. The optical frequency of signal laser 120 is modulable (that is, adapted to be modulated) in correspondence with waves of acoustic energy 105 incident on transducer 100. Signal laser 120 is mounted to transducer housing 110 such that the signal laser is coupled to receive incident acoustic energy and undergo compression and rarefaction in response to the incident energy. As used herein, "mounted to" refers to any manner of attachment, support, or coupling which provides a structure that enables signal laser 120 to operate as described below. Transducer housing 110 comprises a material such as metal, plastic, glass, or the like which provides sufficient structural strength and acceptable acoustic performance for the transducer.

Signal laser 120 typically comprises a microchip laser, or alternatively, a microcavity laser or the like, although any type of laser which is adaptable to be responsive to incident acoustic energy as described below may be used. Signal laser 120 comprises an optical cavity 130 disposed between a first reflector 134 and a second reflector 136, and in which a lasing medium 132 (also known as the gain crystal) is disposed. Lasing medium 132 comprises a material which provides the signal laser performance characteristics as described herein, such as variation of optical frequency generated in response to changes in the length of the optical cavity. Examples of lasing mediums advantageously used in the present invention include neodymium doped yttrium garnet (Nd:YAG); neodymium doped yttrium vanadate (Nd:YVO$_4$); neodymium doped glass (Nd:glass); chromium doped lithium strontium aluminum fluoride (Cr:LiSAF); lithium strontium calcium aluminum fluoride (LiSCAF); and lithium calcium aluminum fluoride (Li:CAF), or the like; alternately, the lasing medium may comprise an organic dye liquid lasing medium comprising rhodamine 6G or the like.

Lasing medium 132 has substantially plane-parallel end surfaces 133, 135 which are disposed opposite one another. First reflector 134 is disposed proximate to surface 133 of lasing medium 132 and second reflector 136 is disposed proximate to surface 135 of the lasing medium. For example, in signal laser 130 having a gain crystal of the type discussed above, first and second reflectors typically comprise a dielectric material such as silicon nitride, silicon oxide, aluminum oxide, or the like, and are disposed immediately adjacent to the lasing medium surface, such as by being deposited onto the respective surfaces 133, 135 of lasing medium 132. Reflectors 134, 136 typically are relatively thin, having a thickness of 1 to 5 microns or less. Dependent on the arrangement of signal laser 100, one reflector will typically be substantially fully reflective, and one will be partially transmissive, such that light generated when the gain crystal begins to lase can escape the optical cavity. In the signal laser arrangement illustrated in FIG. 2, first reflector 134 is slightly transmissive at the lasing wavelength (e.g., having a reflectance R of about 99% at the lasing wavelength) (at the laser pump wavelength, however, first reflector 134 has a substantial transmittance, e.g., 80% or greater). Second reflector 136 is substantially totally reflective at both the lasing wavelength and the laser pump wavelength (having an R value of about 100%, e.g., 99.98%).

Figure 2A:
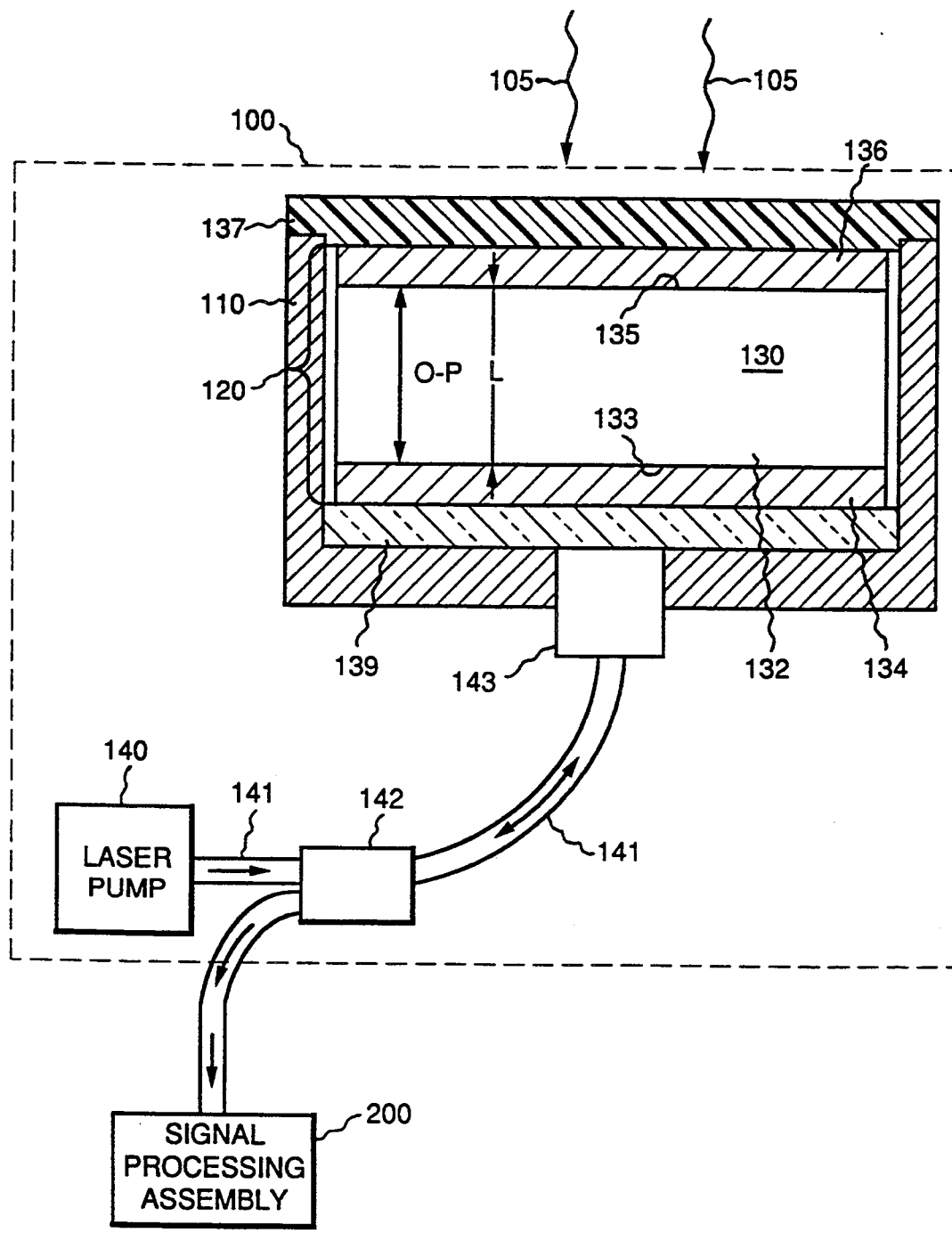
FIG. 2(A) is a partially schematic diagram and partially block diagram of an optical transducer illustrating one embodiment of the present invention.

An optical path axis, denoted by the letters "O-P" in FIG. 2(A), extends between and is substantially perpendicular to opposing surfaces 133, 135, of lasing medium 132. The alignment of optical path axis O-P is substantially parallel to the path of light energy reflected between first and second reflectors 134, 136 as the gain crystal lases. Cavity length "L", as shown in FIG. 2, corresponds to the distance between the opposing reflective surfaces of first and second reflectors 134, 136. The length of the cavity supports longitudinal modes spaced sufficiently apart in wavelength such that only one mode overlaps the gain bandwidth of the crystal, and thus only one mode lases. The optical frequency at which signal laser 120 lases is a function of the length L of the optical cavity. The thickness of lasing mediums used in accordance with the present invention is typically between about 10 μm and 1000 μm.

In accordance with the present invention signal laser 120 is adapted so that compression and rarefaction of the lasing medium along optical path axis O-P results in variations of the length L of the optical cavity along that axis. Variations in the optical frequency at which lasing medium 132 lases due to changes in the lasing medium refractive index n and the optical cavity length L are expressed by the relationship:

$$|\Delta\omega| = 2\pi c/\lambda(\Delta L/L + \Delta n/n + \Delta\phi_{R1} + \Delta\phi_{R2})$$

wherein:

$|\Delta\omega|$ is the absolute value of the change in the optical frequency of signal laser 120;
c is the speed of light;
λ is the wavelength of the light generated by signal laser 120;
L is the length of optical cavity 130;
ΔL is the variation of the length of the optical cavity;
n is refractive index of lasing medium 132;
Δn is the variation of the refractive index of the lasing medium;
$\Delta\phi_{R1}$ is the phase shift of the light upon reflection at first reflecting surface $R_1$; and
$\Delta\phi_{R2}$ is the phase shift of the-light upon reflection at second reflecting surface $R_2$.

In accordance with this embodiment of the present invention, lasing medium 132 is selected such that the refractive index of the lasing material exhibits negligible changes in response to changes in the length of the cavity, and thus the value of Δn is small enough to be disregarded from the standpoint of the above equation. For example, one lasing material, neodymium doped yttrium garnet (Nd:YAG), exhibits minimal changes in refractive indices in response to strains arising from a change in length of the lasing medium (for a given change in length, the effect of the change in refractive index on change in optical frequency generated by the laser is approximately two orders of magnitude less). Further, for the signal laser arrangement illustrated in FIG. 2(A), the $\Delta\phi_R$ term for both first and second reflectors is negligible as essentially no phase change occurs at these reflective surfaces due to effects of the incident acoustic energy. Consequently, $|\Delta\omega|$, the absolute value of the change of optical frequency of signal laser 120, is directly proportional to and primarily results from the change in length of the optical cavity of signal laser 120; the optical frequency generated by signal laser 120 is thus modulable by acoustic energy incident on transducer 100 as signal laser 120 is disposed such that the incident acoustic energy causes variations in the length of optical cavity 130.

Transducer 100 further comprises a laser pump 140. Laser pump 140 is coupled to the optical cavity via a fiber optic line 141, a wavelength selective coupler 142, and an optical coupler 143. Wavelength selective coupler 142 passes optical signals of different wavelengths along different paths; thus, light generated by laser pump 140 to excite signal laser 120 is of a frequency so that it is directed along optical fiber 141 to optical coupler 143. The modulated light signal generated by signal laser 120 when it is lasing, which has a different optical frequency than the excitation signal from laser pump 140, is passed on optical fiber 141 along a path that directs the signal to signal processing assembly 200. Optical coupler 143 advantageously comprises lenses disposed to efficiently couple light passing into signal laser 120 from laser pump 140 and light generated in the laser into the optical fiber for transmission to the signal processing assembly.

Transducer 100 is further advantageously adapted to generate ultrasound pulses to be transmitted through acoustic couplant 25 into subject 15 (FIG. 1). Laser pump 140 (FIG. 2) is capable of generating a temporally-varying selectable excitation energy in accordance with a selected transmit-receive cycle. For example, in the transmit mode, a relatively high level of excitation energy is generated by laser pump 140 and applied to signal laser 120; in the receive mode less excitation energy is applied to signal laser 120 than in the transmit mode but the excitation energy is sufficient to cause the laser device to lase at a particular frequency for a given configuration of the signal laser. The high level of excitation energy in the transmit mode is absorbed by lasing medium 132 and results in physical expansion of lasing medium 132 along optical path axis O-P; this expansion along axis O-P generates an acoustic pulse, i.e., a wave of acoustic energy.

Transducer 100 additionally comprises an acoustic impedance matching layer 137 disposed over second reflector 136 and an optically transparent acoustic backing layer 139 disposed between first reflector 134 and transducer housing 110. Acoustic impedance matching layer 137 is selected to provide a desired acoustic coupling between signal laser 130 and couplant 15; for example, for a selected acoustic wavelength, optimal coupling is obtained when impedance matching layer 137 has a thickness of about one-quarter the acoustic wavelength in the matching layer material, and the acoustic impedance has a value which is the square of the product of the respective acoustic impedances of the two materials on either side of the impedance matching layer. Impedance matching layer 137 typically comprises a material having the above mentioned characteristics and that is relatively non-attenuating, such as a polymer or the like.

Acoustic backing layer 139 is disposed between signal laser 120 and transducer housing 110 such that the incident acoustic energy that has passed through signal laser 120 is attenuated in the backing layer. This structure provides attenuation so that changes in the optical cavity length are predominantly a function of incident acoustic energy entering the transducer and less a function of reflection of this incident energy from the acoustic backing layer, thereby enhancing the sensitivity of the transducer. It is also desirable, however, that acoustic backing layer 139 cause generated acoustic pulses, e.g., transmit pulses of acoustic energy from the transducer, to be reflected to enhance the transmitted signal strength; in balance, the more critical property of acoustic backing layer 139 is attenuation of the incident acoustic energy. Acoustic backing layer 139 typically comprises an organic material, such as an epoxy, with an appropriate filler mixed therein to provide the desired acoustic performance. For example, tungsten or lead is commonly mixed with epoxy to form the acoustic backing layer.

In operation, transducer 100, when operating in the transmit mode, generates an acoustic pulse which propagates toward the sample under examination. In the receive (detect) mode, acoustic energy reflected from the sample is incident on the transducer and modulates the optical frequency of signal laser 120. Laser pump 140 is controlled, e.g., by a control computer (not shown), to provide the desired level of excitation energy to signal laser 120. The level of the energy applied and the timing between application of transmit-level and receive-level excitation energy is determined by, among other things, the type of lasing medium used and the desired range of acoustic detection. In the typical transmit-receive cycle, after the acoustic pulse has been generated excitation energy to the lasing medium is reduced and the optical cavity contracts such that length L of the optical cavity returns to a nominal range which corresponds to the undisturbed optical frequency of signal laser 120. Alternatively, separate transducers can be used respectively for generation and detection of acoustic energy (not shown), in which case each transducer is adapted for operation for the respective detect or generation purpose for which it is used.

As acoustic energy reflected from the sample is incident on transducer 100, the lasing medium is displaced along the optical path axis in response to compression and rarefaction from the incident acoustic energy. This displacement is manifested in variations in length L of optical cavity 130, which in turn causes the optical frequency of the light generated by the laser to change in correspondence with the incident acoustic energy. As the amplitude of the incident energy increases, the variation in the length of the optical cavity also increases and thus the variation in the optical frequency similarly increases. Signal laser 120 is adapted to operate at a nominal optical frequency (no displacement of the optical cavity) that results in substantially linear variation of the optical frequency in response to the variations in length of the optical cavity. Optical transducer 100 is readily adapted to use in an array of transducers, and the optical fiber connections to the signal laser mounted in the transducer housing enable many transducers to be positioned close together due to the compact nature of the optical fiber connections. This arrangement provides for small pixel size and high pixel density to provide enhanced imager performance.

Figure 2B:
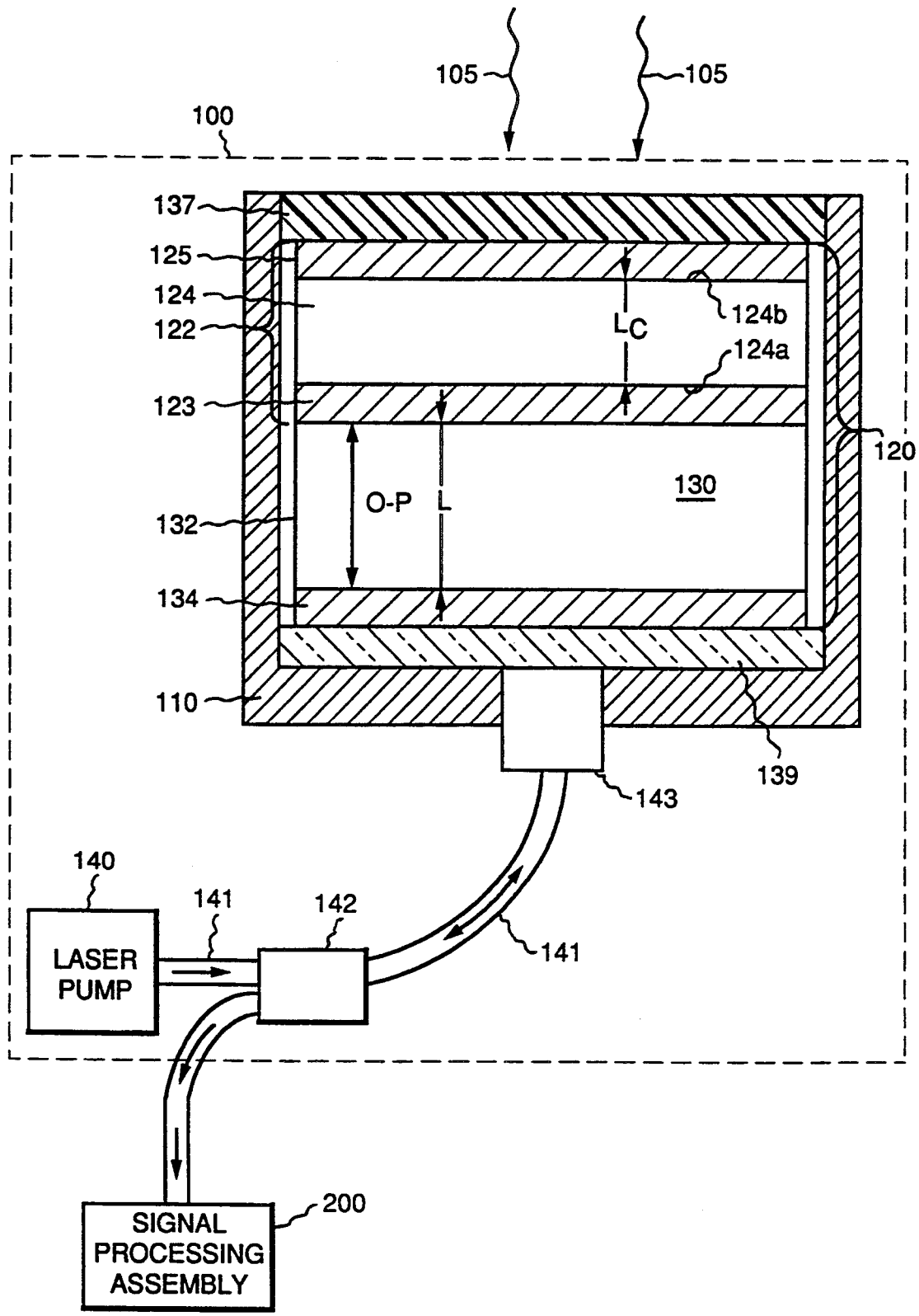
FIG. 2(B) is a partially schematic diagram and partially block diagram of an optical transducer illustrating another embodiment of the present invention.

Another embodiment of the present invention is illustrated in FIG. 2(B). This embodiment of transducer 100 is similar to the embodiment illustrated in FIG. 2(A) and described above except as follows. In lieu of a single second reflector 136 (FIG. 2(A)), a compliant cavity 122 (FIG. 2(B)) is coupled to surface 135 of lasing medium 132. Compliant cavity 122 is a Gires-Tournois interferometer and comprises an acoustically compliant medium 124 disposed between a partially transmissive reflector 123 and a high reflectance reflector 125. Partially transmissive reflector 123 is optically coupled to surface 135 of lasing medium 132 and to a substantially planar surface 124a of acoustically compliant medium 124. High reflectance reflector 125 is coupled to a planar surface 124b of acoustically compliant medium 124; surface 124b is disposed substantially parallel to and on an opposing face of compliant medium 124 from surface 124a. Partially transmissive reflector 123 has a reflectance in the range between about 50%–98%, and high reflectance reflector 125 has a reflectance in the range 99.8%–100%. Both reflector 123 and reflector 125 typically comprise a dielectric material as described above with respect to first and second reflectors 134, 136 in FIG. 2(A). The particular reflectance of partially transmissive reflector 123 is a determinant of the operating characteristics of the Gires-Tournois interferometer.

Acoustically compliant medium 124 typically comprises an optically transmissive material having a lower acoustic impedance than the lasing medium, for example, a polymer or the like. Alternatively, compliant medium may comprise a fluid or gas having the above identified properties, in which case a compliant retaining ring (not shown) comprising a polymer or the like is disposed around the medium to contain it in the compliant cavity.

The distance light travels along optical path axis O-P in compliant cavity 122 is designated by $L_c$, which length is preferably less than the length L of the lasing medium along the optical path axis, as illustrated by the distance between first reflector 134 and partially transmissive reflector 123. The relative respective thickness of reflectors 123 and 125 is small (e.g., an order of magnitude less) with respect to $L_c$.

In operation, compliant cavity 122 enhances the sensitivity of transducer 100 by causing a larger effective change in optical path length L of optical cavity 130 in response to incident acoustic energy, thereby causing a proportionately larger change in the optical frequency generated by signal laser 120. This effective change results from the Gires-Tournois interferometer characteristics of compliant cavity 122, in particular, compliant cavity 122 is disposed to provide the second reflector for lasing medium 132. Changes in the length of compliant cavity 122 in response to incident acoustic energy change the constructive and destructive interference patterns of light in cavity 122, and these changes effectively result in a change in the phase of light ($\Delta\phi_{R2}$)being reflected back into optical cavity 130. In the context of the mathematical expression for change in optical frequency described above, $$|\Delta\omega| = 2\pi c/\lambda(\Delta L/L + \Delta n/n + \Delta\phi_{R1} + \Delta\phi_{R2})$$

the term for phase change at the second reflective surface of the optical cavity, $\Delta\phi_{R2}$ is no longer negligible, but is of a magnitude to effect the change in frequency. The change in compliant cavity length thus causes a change in the optical frequency such that changing the compliant cavity length serves to increase the sensitivity of the transducer to incident acoustic energy.

Figure 3A:
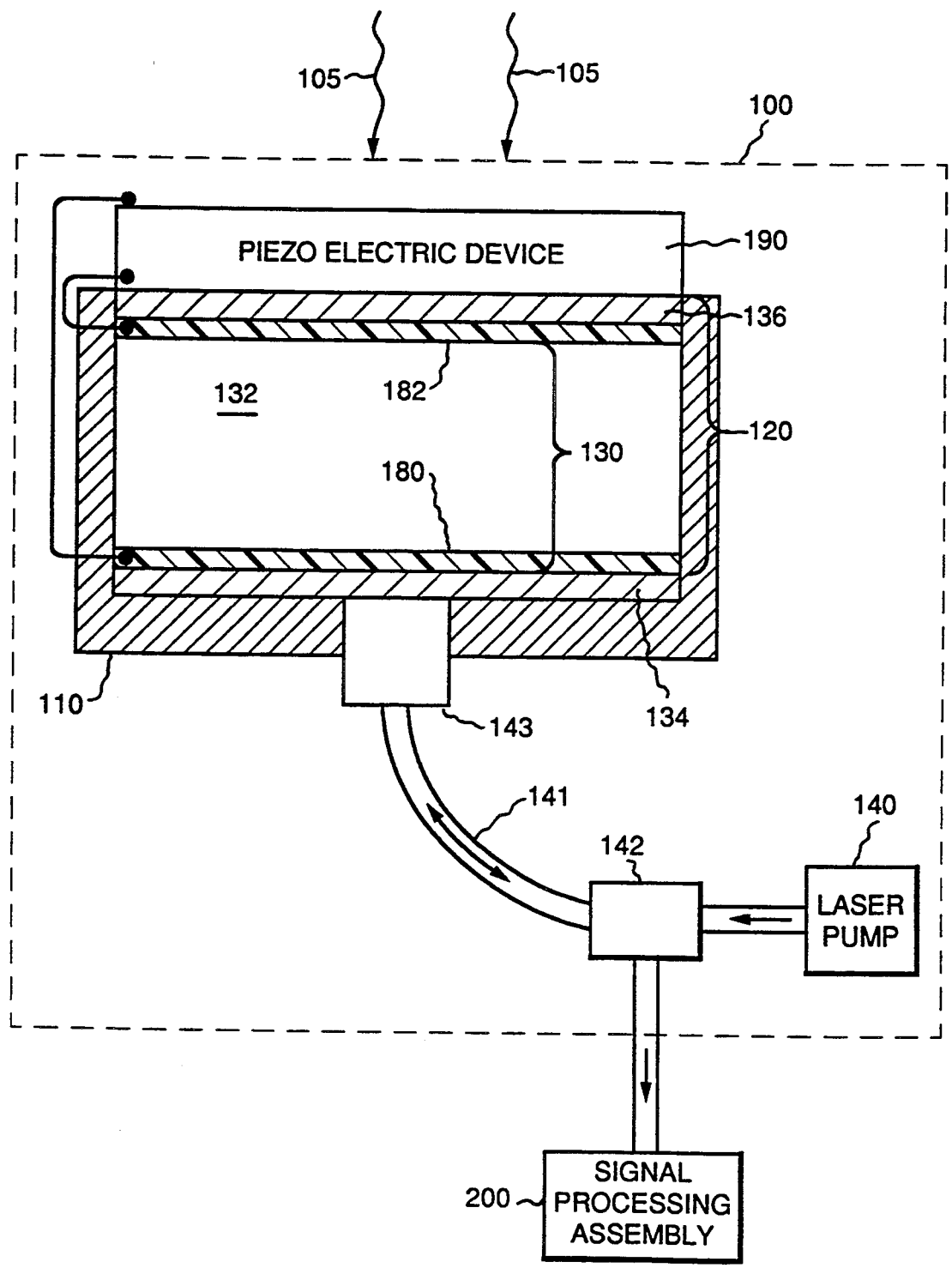
FIG. 3(A) is a partially schematic and partially block diagram of an optical transducer illustrating a further embodiment of the present invention.
Figure 3B:
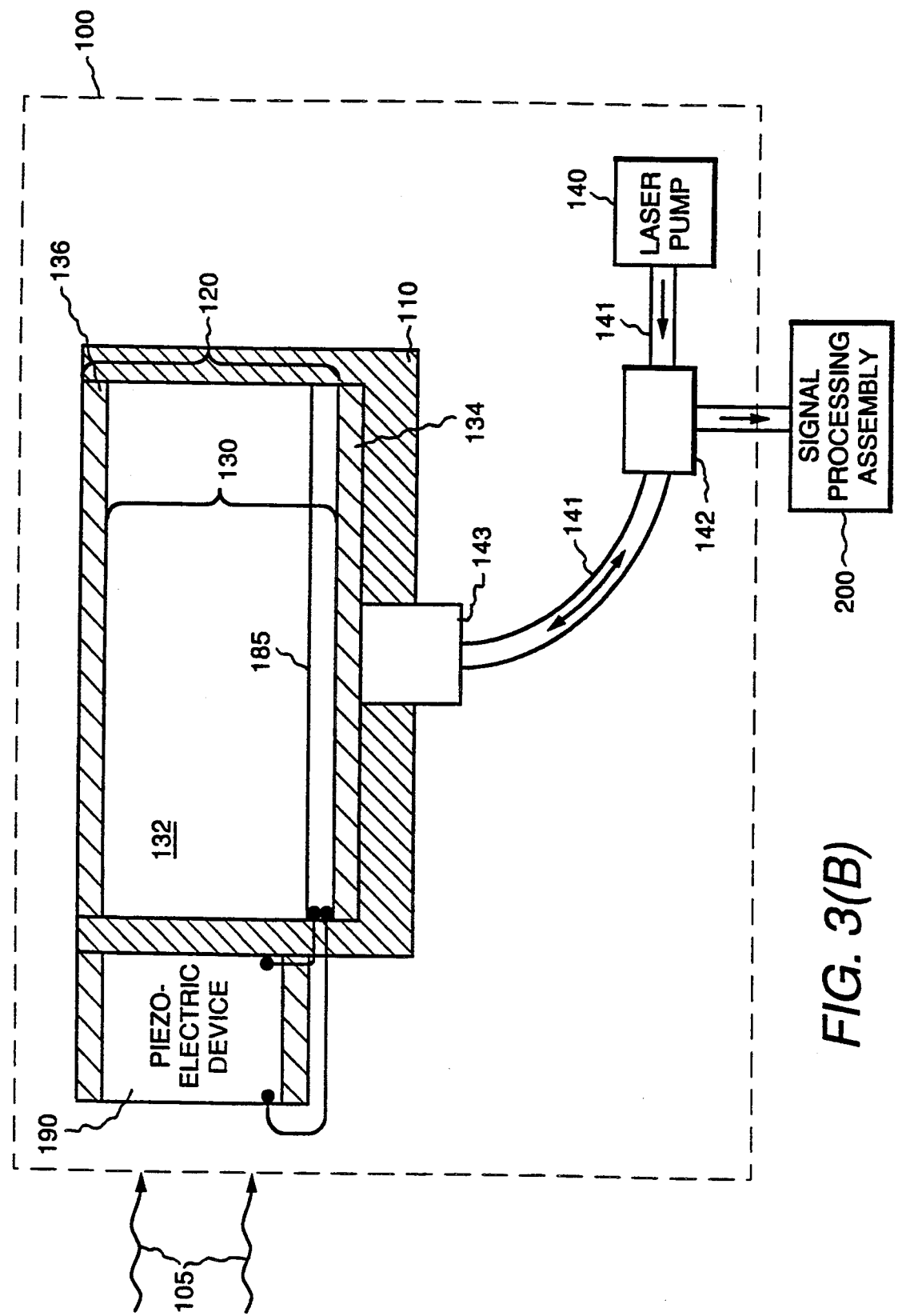
FIG. 3(B) is a partially schematic and partially block diagram of an optical transducer illustrating yet a further embodiment of the present invention.

Other embodiments of the present invention are illustrated in FIGS. 3(A) and 3(B). In each of the embodiments illustrated in these figures, the signal laser is operated to generate an optical signal, the frequency of which varies in correspondence with the incident acoustic energy. The modulation of the optical frequency of the signal laser is accomplished through variation of the refractive index in the optical cavity.

As illustrated in FIG. 3(A), optical transducer 100 comprises transducer housing 110 and signal laser 120, which is mounted to the transducer housing. As with the embodiment of optical transducer described above, laser pump 140 is optically coupled to signal laser 120 via optic fiber 141, wavelength selective coupler 142, and optical coupler 143. Signal laser 120 comprises lasing medium 132 disposed in optical cavity 130 and first and second reflectors 134, 136.

In accordance with the embodiment of the present invention illustrated in FIG. 3(A), signal laser 120 further comprises first and second conductors 180, 182. Conductors 180, 182 each typically comprise a layer of transparent conducting oxide such as indium tin oxide or the like, which are respectively disposed on opposing surfaces of lasing medium 132 so that application of an electrical signal to the conductors generates an electric field across lasing medium 132. As illustrated in FIG. 3(A), first conductor 180 is advantageously disposed between lasing medium 132 and first reflector 134, and second conductor 182 is disposed between second reflector 136 and lasing medium 132; in this arrangement each conductor comprises a transparent material so that light can pass through the conductors to the adjoining reflectors and lasing medium. Alternatively, conductors 180, 182 can be respectively disposed across first and second reflectors 134, 136 such that the respective reflector is disposed between the respective conductor and the lasing medium (not shown). In a further alternative embodiment, first and second conductors 180, 182 can be disposed adjacent to (but not necessarily in contact with) other opposing pairs of surfaces of lasing medium 132 so that the desired electric field can be generated across the lasing medium (not shown). So long as light is not required to pass through a conductor, non-optically transparent conductive materials may comprise the conductor.

Optical transducer 100 further comprises a piezoelectric device 190. Piezoelectric device 190 is electrically coupled to first and second conductors 180, 182 such that, for example, a voltage signal generated by the piezoelectric device in response to physical deflection of the device is applied across lasing medium 132 by conductors 180, 182. Piezoelectric device 190 is disposed such that acoustic energy incident on transducer 100 is received by device 190 and translated into a corresponding electrical signal. Piezoelectric device 190 is illustrated in FIG. 3(A) disposed proximate to signal laser 120; alternatively, piezoelectric device 190 may be disposed spaced apart from signal laser 120, as discussed below with respect to FIG. 3(B). Piezoelectric device 190 is illustrated in FIG. 3(A) disposed adjacent to signal laser 120. In a typical transducer arrangement, piezoelectric device 190 is also adapted to be driven by an electrical signal to generate an acoustic pulse to be transmitted into the subject to be analyzed.

The optical frequency of light generated by signal laser 120 is modulated such that the optical frequency corresponds to the incident acoustic energy. The variation of the optical frequency is expressed by the relationship:

$$|\Delta\omega| = 2\pi c/\lambda(\Delta L/L + \Delta n/n + \Delta\phi_{R1} + \Delta\phi_{R2})$$

the terms of which equation are described above. In this embodiment of the invention, optical cavity 132 undergoes little or no displacement in response to incident acoustic energy and consequently the $\Delta L/L$ term is inconsequential. Similarly, the $\Delta\phi_{R1}$ and $\Delta\phi_{R1}$ terms are negligible. The electrical signal generated by piezoelectric device is applied across lasing medium 132 and the refractive index of lasing medium 132 varies in response to the applied voltage. Thus, in the mathematical representation above, the variation in optical frequency generated by signal laser 120 is primarily determined by the $\Delta n/n$ term. Lasing medium 132 is selected such that the variation in optical frequency is substantially linear in a selected range for the applied electrical signal and piezoelectric device 190 is selected to generate electrical control signals that correspond to that selected range. Lasing medium 132 comprises, for example, neodymium doped lithium niobate (Nd:LiNbO$_3$) or the like.

The embodiment of the present invention illustrated in FIG. 3(B) is similar in structure and operation to the optical transducer illustrated in FIG. 3(A) and described above with the following exceptions. Signal laser 120 comprises an electro-optic cell 185 disposed in optical cavity 130 such that light passing between reflectors 134 and 136 pass through cell 185. Electro-optic cell 185 is electrically coupled to piezoelectric device 190 and is adapted to be responsive to the electrical signal generated by device 190. Electro-optic cell 185 advantageously comprises a Pockels cell or the like which changes its refractive index in response to a control signal. The optical frequency of signal laser 120 is thus modulated by varying the refractive index of the optical cavity with electro-optic cell 185. Consequently, no conductors (such as conductors 180, 182 in the embodiment illustrated in FIG. 3(A)) are used in this embodiment of the present invention. Further, lasing medium 132 preferably comprises a material the refractive index of which is not responsive to an electric field; for example, lasing medium 132 advantageously comprises neodymium doped glass (Nd:glass); neodymium doped yttrium garnet (Nd:YAG); neodymium doped yttrium vanadate (Nd:YVO$_4$); chromium doped lithium strontium aluminum fluoride (Cr:LiSAF), lithium strontium calcium aluminum fluoride (LiSCAF); and lithium calcium aluminum fluoride (Li:CAF), or the like. Additionally, as illustrated in FIG. 3(B), piezoelectric device 190 and signal laser 120 can be disposed spaced apart in transducer housing 100; such an arrangement may be desirable to optimize the surface area of transducer 100 exposed for transmission and reception of acoustic energy in an array of transducers.

In operation, incident acoustic energy on optical transducer 100 results in piezoelectric device 190 generating an electrical signal that corresponds to the amplitude of the incident acoustic energy. The application of this electrical signal to signal laser 120 modulates the refractive index of the optical cavity of the laser and results in the corresponding modulation of the optical frequency of light generated by the laser in correspondence with the incident acoustic energy. The electrical signal is applied to conductors to generate an electric field across the lasing medium, and hence vary the refractive index of the lasing medium, or, alternatively, the electrical signal is coupled to drive an electro-optic cell disposed in the optical cavity to modulate the refractive index of the cell. The modulated optical signal generated by signal laser 120 is coupled to signal processing assembly 200 in which it is processed, typically with heterodyne devices, or alternatively, spectral filters so as to generate an output signal that corresponds to the amplitude of the incident acoustic energy for use in imaging or analysis.

Optical transducers in accordance with the present invention are advantageously used in acoustic energy imaging systems such as ultrasound systems used for medical imaging or for non-destructive evaluation of materials.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An optical transducer for detecting acoustic energy propagated through a medium, the transducer comprising:
    a transducer housing, and
    a signal laser mounted in said transducer housing,
    said signal laser comprising a single optical cavity having an optical path axis, a lasing medium disposed in said optical cavity, and first and second reflectors, said first and second reflectors being respectively disposed immediately adjacent to opposite ends of said lasing medium along said optical path axis such that a single lasing output signal is generated by said signal laser, the optical frequency of said single lasing output signal being modulable in correspondence with acoustic energy incident on said transducer.

2. The transducer of claim 1 wherein said signal laser is disposed in said transducer housing such that acoustic energy incident on said optical transducer is communicated along said optical path axis in said optical cavity so that said cavity undergoes compression and rarefaction along said optical path axis in correspondence with said incident acoustic energy.

3. The transducer of claim 2 further comprising a laser pump optically coupled to said optical cavity, said laser pump being adapted to provide a selectable level of excitation energy to said lasing medium.

4. The transducer of claim 3 wherein said signal laser is adapted such that the frequency of light generated by said signal laser varies with the compression and rarefaction of said optical cavity in response to said incident acoustic energy substantially in correspondence with the following relationship:

$$\Delta\omega = 2\pi c/\lambda(\Delta L/L + \Delta n/n + \Delta\phi_{R1} + \Delta\phi_{R2})$$

wherein:
    $\Delta\omega$ is the change in the optical frequency of said signal laser in response to said incident acoustic energy;
    c is the speed of light;
    $\lambda$ is the wavelength of the light generated by said signal laser;
    L is the length of said optical cavity;
    $\Delta L$ is the variation of the length of said cavity in response to said incident acoustic energy;
    n is the refractive index of said lasing medium,
    $\Delta n$ is the variation of the refractive index of said lasing medium;
    $\Delta\phi_{R1}$ is the phase shift of the light upon reflection at said first reflector; and
    $\Delta\phi_{R2}$ is the phase shift of the light upon reflection at second reflector.

5. The transducer of claim 4 wherein said lasing medium comprises a material having an index of refraction that remains substantially the same when said cavity experiences compression and rarefaction in response to said incident acoustic energy such that the variation of optical frequency of said signal laser in response to said incident acoustic energy varies substantially linearly with the variation of the length of said cavity.

6. The transducer of claim 5 wherein said transducer further comprises an acoustic impedance matching layer disposed over said second reflector, said acoustic impedance matching layer being selected to provide a desired acoustic coupling between said lasing medium and the medium through which the detected acoustic energy is propagated.

7. The transducer of claim 6 wherein said laser pump comprises a temporally-varying selectable excitation energy generator so as to provide temporally distinct transmit and receive levels of excitation energy to said lasing medium, and said signal laser is mounted in said transducer housing such that said optical cavity is displaced along its optical path axis in response to the transmit level of excitation energy.

8. The transducer of claim 7 wherein said lasing medium is selected from the group consisting of neodymium doped yttrium garnet (Nd:YAG); neodymium doped yttrium vanadate (Nd:YVO4); neodymium doped glass (Nd:glass); chromium doped lithium strontium aluminum fluoride (Cr:LiSAF); lithium strontium calcium aluminum fluoride (LiSCAF); and lithium calcium aluminum fluoride (Li:CAF).

9. The transducer of claim 7 wherein signal laser comprises an organic dye liquid lasing medium comprising rhodamine 6G.

10. The transducer of claim 8 further comprising an acoustic backing layer disposed between said signal laser and said transducer housing.

11. The transducer of claim 1 further comprising an optical cavity refractive index modulator adapted to be responsive to said incident acoustic energy.

12. The transducer of claim 11 wherein said optical cavity refractive index modulator comprises an electro-optic modulator.

13. The transducer of claim 12 further comprising a piezoelectric device electrically coupled to said electro-optic modulator,
    said piezoelectric device being disposed to detect said incident acoustic energy and generate a corresponding electrical control signal, said electro-optic modulator being adapted to be responsive to said electrical control signal such that variations in the electrical control signal produce corresponding variations in the optical frequency of said signal laser.

14. The transducer of claim 13 wherein said electro-optic modulator comprises a Pockels cell.

15. The transducer of claim 12 wherein said optical cavity refractive index modulator comprises a piezoelectric device electrically coupled to a plurality of electrical conductors, said electrical conductors being disposed to generate an electric field across said lasing medium in response to an electrical signal applied to said conductors,
    said piezoelectric device being disposed to acoustically receive said incident acoustic energy and generate a corresponding electrical control signal, said lasing medium being responsive to said electrical control signal such that variations in the electrical control signal produce corresponding variations in the optical frequency of said signal laser.

16. The transducer of claim 1 wherein said signal laser comprises a microchip laser.

17. The transducer of claim 1 wherein said signal laser comprises a microcavity laser.

18. The transducer of claim 1 wherein the thickness of said lasing medium along said optical path axis is between about 10 μm and 1000 μm.

19. An optical transducer for detecting acoustic energy propagated through a medium, the transducer comprising:
   a transducer housing,
   a signal laser mounted in said transducer housing,
   a laser pump optically coupled to said optical cavity, said laser pump being adapted to provide a selectable level of excitation energy to said lasing medium;
   said signal laser further comprising an optical cavity having an optical path axis; a lasing medium disposed in said optical cavity; a first reflector, said first reflector being disposed at a first end surface of said optical cavity; and a compliant cavity optically coupled to a second end surface of said optical cavity, said second end surface being disposed opposite said first end surface;
   said compliant cavity further comprising a partially transmissive reflector, a compliant medium, and a high reflectance reflector, said partially transmissive reflector being optically coupled to said second end surface of said optical cavity, said compliant medium being disposed between and optically coupled to said partially transmissive reflector and said high reflectance reflector such that a single lasing output signal is generated by said signal laser, the optical frequency of said single lasing output signals generated by said signal laser being modulable in correspondence with acoustic energy incident on said transducer;
   said compliant medium being adapted to be responsive to a selected transmit-level excitation energy so as to selectively generate an acoustic pulse.

20. The transducer of claim 19 wherein said compliant cavity comprises a Gires-Tournois interferometer.

21. The transducer of claim 20 wherein said signal laser is adapted such that acoustic energy incident on said optical transducer is communicated across said compliant cavity along said optical path axis in said optical cavity so that said compliant cavity undergoes compression and rarefaction along said optical path axis in correspondence with said incident acoustic energy.

22. The transducer of claim 21 wherein said signal laser is adapted such that the frequency of light generated by said signal laser varies with the compression and rarefaction of said optical cavity and said compliant cavity in response to said incident acoustic energy substantially in correspondence with the following relationship:

$$\Delta\omega = 2\pi c/\lambda(\Delta L/L + \Delta n/n + \Delta\phi_{R1} + \Delta\phi_{R2})$$

wherein:
   $\Delta\omega$ is the change in the optical frequency of said signal laser in response to said incident acoustic energy;
   $c$ is the speed of light;
   $\lambda$ is the wavelength of the light generated by said signal laser;
   $L$ is the length of said optical cavity;
   $\Delta L$ is the variation of the length of said cavity in response to said incident acoustic energy;
   $n$ is the refractive index of said lasing medium,
   $\Delta n$ is the variation of the refractive index of said lasing medium;
   $\Delta\phi_{R1}$ is the phase shift of the light upon reflection at said first reflector; and
   $\Delta\phi_{R2}$ is the phase shift of the light upon reflection at said compliant cavity 23. The transducer of claim 22 wherein said signal laser is adapted such that the index of refraction remains substantially the same when said optical cavity experiences compression and rarefaction in response to said incident acoustic energy and the variation of optical frequency of said signal laser in response to said incident acoustic energy varies substantially linearly with the variation of the length of said compliant cavity.

24. The transducer of claim 22 wherein said partially transmissive reflector has a reflectance in the range between about 0% and 98%.

25. The transducer of claim 24 wherein said high reflectance reflector has a reflectance in the range between about 9.8% and 100%.

26. The transducer of claim 25 wherein said compliant medium comprises a material selected from the group comprising optically transmissive solid polymers and optically transmissive liquids, and optically transmissive gases.

27. The transducer of claim 24 wherein said transducer further comprises an acoustic impedance matching layer disposed on said compliant cavity, said acoustic impedance matching layer being selected to provide a desired acoustic coupling between said compliant cavity and the medium through which the detected acoustic energy is propagated.

28. The transducer of claim 27 further comprising an acoustic backing layer disposed between said signal laser and said transducer housing.

29. A method of detecting acoustic energy incident on a transducer assembly comprising the step of modulating a laser to generate a single optical output signal such that the optical frequency of said single optical output signal corresponds to the incident acoustic energy;
   said laser comprising a single optical cavity consisting/essentially of a lasing medium and two reflectors, one reflector being disposed immediately adjacent to one end of said lasing medium and the second reflector being disposed immediately adjacent to the opposite end of said lasing medium;
   the step of modulating said laser further comprising the step of translating said incident acoustic energy into variations of the length along a selected axis of said optical cavity in said laser.

30. The method of claim 29 wherein the the step of translating said incident acoustic energy comprises subjecting said cavity to compression and rarefaction in correspondence with said incident optical energy such that said optical frequency changes substantially linearly with changes in the length of said cavity.

31. The method of claim 30 wherein the step of subjecting said cavity to compression and rarefaction comprises subjecting an optical cavity in which a lasing medium is disposed to compression and rarefaction from the incident acoustic energy.

32. A method of detecting acoustic energy incident on a transducer assembly comprising the step of modulating a laser to generate a single optical output signal such that the optical frequency of said single optical output signal corresponds to the incident acoustic energy; the step of modulating said laser further comprising the steps of:

generating an electrical signal corresponding to the physical displacement caused by said incident acoustic energy at said transducer, and varying the index of refraction of said lasing medium in correspondence with said electrical signal such that said optical frequency of said laser varies in correspondence with said incident acoustic energy.

33. A method for performing ultrasound analysis of an object comprising the steps of:

generating an ultrasound pulse in a transducer, said pulse being generated by the displacement of a lasing medium in a signal laser in response to applied energy;

communicating said ultrasound pulse into said object;

modulating the optical frequency of the optical signal generated by said signal laser in correspondence with reflections of said ultrasound pulse from said object;

processing said optical signal to generate a transducer output signal corresponding to the detected reflections of said ultrasound pulse.

34. The method of claim 33 further comprising the step of selectively pumping said signal laser in a transmit/receive cycle so as to apply transmit level energy to generate said ultrasound pulse and subsequently apply receive level energy to cause said lasing medium to operate in a frequency range such that it is responsive to modulation signals corresponding to the reflections of acoustic energy from said object.

35. The method of claim 34 wherein the step of modulating said signal laser further comprises the step of varying the length along a selected axis of a cavity in said signal laser in correspondence with ultrasound reflections from said object.

36. The method of claim 35 wherein said optical frequency varies substantially linearly with the varying length of said cavity.

37. The method of claim 34 wherein the step of modulating said signal laser further comprises the steps of:

generating an electrical signal corresponding to the physical displacement caused by said ultrasound reflections at said transducer, and varying the index of refraction of a lasing medium in an optical cavity in said signal laser in correspondence with said electrical signal such that said optical frequency of said signal laser varies in correspondence with said ultrasound reflections.

38. An ultrasound system for analyzing a subject, comprising:

an optical transducer, and a signal processing assembly optically coupled to said transducer, said optical transducer comprising a signal laser, said signal laser further comprising an optical cavity having an optical path axis, a lasing medium disposed in said optical cavity, and first and second reflectors, said first and second reflectors being disposed immediately adjacent to respective opposite ends of said lasing medium along said optical path axis such that a single lasing output signal is generated by said signal laser, the optical frequency of said single lasing output signals generated by said signal laser being modulable in correspondence with acoustic energy incident on said transducer.

39. The system of claim 38 wherein said signal laser is adapted such that said incident ultrasound energy is translated into corresponding variations of the length of said optical cavity along said optical path axis.

40. The system of claim 38 wherein said signal laser further comprises a compliant cavity optically coupled to said optical cavity, said signal laser being adapted such that variations in the length of said compliant cavity cause substantially linear corresponding variations in the optical frequency of light generated by said signal laser.

41. The system of claim 38 wherein said signal laser further comprises a refractive index modulator.

42. The system of claim 41 wherein said refractive index modulator comprises a piezoelectric device responsive to the incident ultrasound energy and is adapted to generate an electrical modulation signal.

43. The system of claim 41 wherein said lasing medium comprises a material the refractive index of which varies in correspondence with an applied electric field.

44. The system of claim 38 wherein said signal processing assembly comprises spectral filters, said spectral filters being responsive to the optical signal generated by said signal laser and adapted to generate an output signal corresponding to the amplitude of the incident acoustic energy detected by said signal laser.

45. The system of claim 38 wherein said signal processing assembly comprises a heterodyne detection device, said heterodyne detection device being responsive to the optical signal generated by said signal laser and adapted to generate an output signal corresponding to the amplitude of the incident acoustic energy detected by said signal laser.

* * * * *